United States Patent [19]

Farstad et al.

[11] Patent Number: 5,392,554
[45] Date of Patent: Feb. 28, 1995

[54] MOUNTING ASSEMBLY FOR DECOYS

[75] Inventors: Virgil L. Farstad, P.O. Box 1842, Minot, N. Dak. 58702; Malcolm Halvorson, Douglas, N. Dak.

[73] Assignee: Virgil L. Farstad, Douglas, N. Dak.

[21] Appl. No.: 33,764

[22] Filed: Mar. 18, 1993

[51] Int. Cl.⁶ .......................................... A01M 31/06
[52] U.S. Cl. ............................................... 43/3
[58] Field of Search ................ 43/2, 3; 248/530, 176, 248/163.1

[56] References Cited

U.S. PATENT DOCUMENTS

| | | | |
|---|---|---|---|
| 364,573 | 6/1887 | Brinkop | 43/3 |
| 811,587 | 2/1906 | Samuell | 43/3 |
| 1,066,587 | 7/1913 | Cunningham . | |
| 2,525,120 | 10/1950 | Ernst | 43/3 |
| 2,536,736 | 1/1951 | Gazalski | 43/3 |
| 2,711,608 | 6/1955 | Fulsta | 43/3 |
| 2,723,480 | 11/1955 | Candy | 43/3 |
| 2,787,074 | 4/1957 | Miller | 43/3 |
| 3,800,457 | 4/1974 | Barrett . | |
| 5,098,050 | 3/1992 | Burns et al. . | |
| 5,172,506 | 12/1992 | Tiley | 43/3 |

Primary Examiner—Kurt C. Rowan

[57] ABSTRACT

A multiple-point frame for mounting a self-aligning decoy. The frame provides multiple-points of attachment to the decoy thereby providing more stability and adaptability to various decoy body designs. A spindle having a concentrically mounted ball bearing is mounted on a stake, and further receives a sleeve in combination with the mounting frame. A ball bearing is also positioned within the sleeve so that when the ball bearing mounted spindle is inserted within the sleeve, the friction between the two parts is substantially reduced. Consequently, the rotational movement about the spindle is enhanced.

33 Claims, 6 Drawing Sheets

MOUNTING ASSEMBLY FOR DECOYS

BACKGROUND OF THE INVENTION

1. Field of the Invention

The present invention relates to self-aligning hunting decoys, and more particularly to an apparatus for mounting decoys.

2. Description of the State of the Art

It is well known that decoys resembling a particular type of fowl must be sufficiently realistic to allure game fowl flying overhead. Because game fowl have a tendency to face into the wind while feeding, care must be taken when setting out decoys to assure that the decoys are faced into the wind. If during a days hunting the wind changes significantly, the hunter must then manually re-adjust each of the decoys so that they again face into the wind.

To solve this problem, game fowl decoys that are rotatably or movably mounted on a rod or stake have been developed along with wind vane features or shapes that automatically face the decoys into the wind. Accordingly, any significant changes in the direction of the wind results in the decoy automatically rotating about the rod or stake as a pivot point so that the decoy always faces into the wind. For example, U.S. Pat. No. 3,800,457 to Barrett discloses an elongated sleeve mounted within a solid body portion of a decoy that is rotatably positioned on a rod or stake. The sleeve is made of metal, and it may be coated with a nylon or polytetrafluoroethylene material so as to reduce friction between the upper portion of the stake and the sleeve. The Gagnon Sr., patent, U.S. Pat. No. 4,893,428 discloses a decoy having a socket mounted substantially at the center of gravity for receiving a stake. The end of the stake received by the socket has a reduced diameter allowing the decoy to rock as well as pivot on the stake. Cunningham, in his U.S. Pat. No. 1,066,587, discloses hollowed decoys which may be compactly nested with other like decoys during transportation. When in use, a head is attached to the body, and a sleeve or socket is also attached interiorly from the back. This sleeve or socket receives a stake which may be driven into the bed of a pond to anchor the decoy.

Barrett, Gagnon Sr., and Cunningham each teach the use of sleeves or sockets in decoys for reception of stakes, so that the decoys can be rotatably or movably mounted. However, the mounting bracket disclosed in Barrett requires that a solid body decoy be used, which does not allow nesting the decoys in one another for transportation and storage. The Gagnon Sr., and Cunningham decoys require that the sleeves or sockets be mounted to a single point located at the center of gravity thereof, which requires an accurate determination of the center of gravity and limits versatility. Furthermore, a single point mounting does not lend itself to a great deal of stability.

SUMMARY OF THE INVENTION

Accordingly, it is a general object of this invention to provide an improved decoy mounting assembly which enables a more stable and yet more versatile mounting for a decoy to self-align itself so as to face into the wind.

A more specific object of the present invention is to provide an improved pivotal support for mounting a decoy on a pedestal.

Another specific object of this invention is to provide a pivotal mounting frame for a decoy that can be assembled with a variety of hollow decoy shapes and sizes and disassembled easily for transportation and storage.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the apparatus of this invention may comprise a mounting frame that has multiple-point, removable attachment to a decoy body. The frame can also have a ball bearing mounted sleeve or hub that rotatably fits over a ball bearing mounted concentric spindle with an axial counterbore therein for rotatably mounting the frame on a stake.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

IN THE DRAWINGS

DETAILED DESCRIPTION OF THE PREFERRED EMBODIMENT

Figure 1:
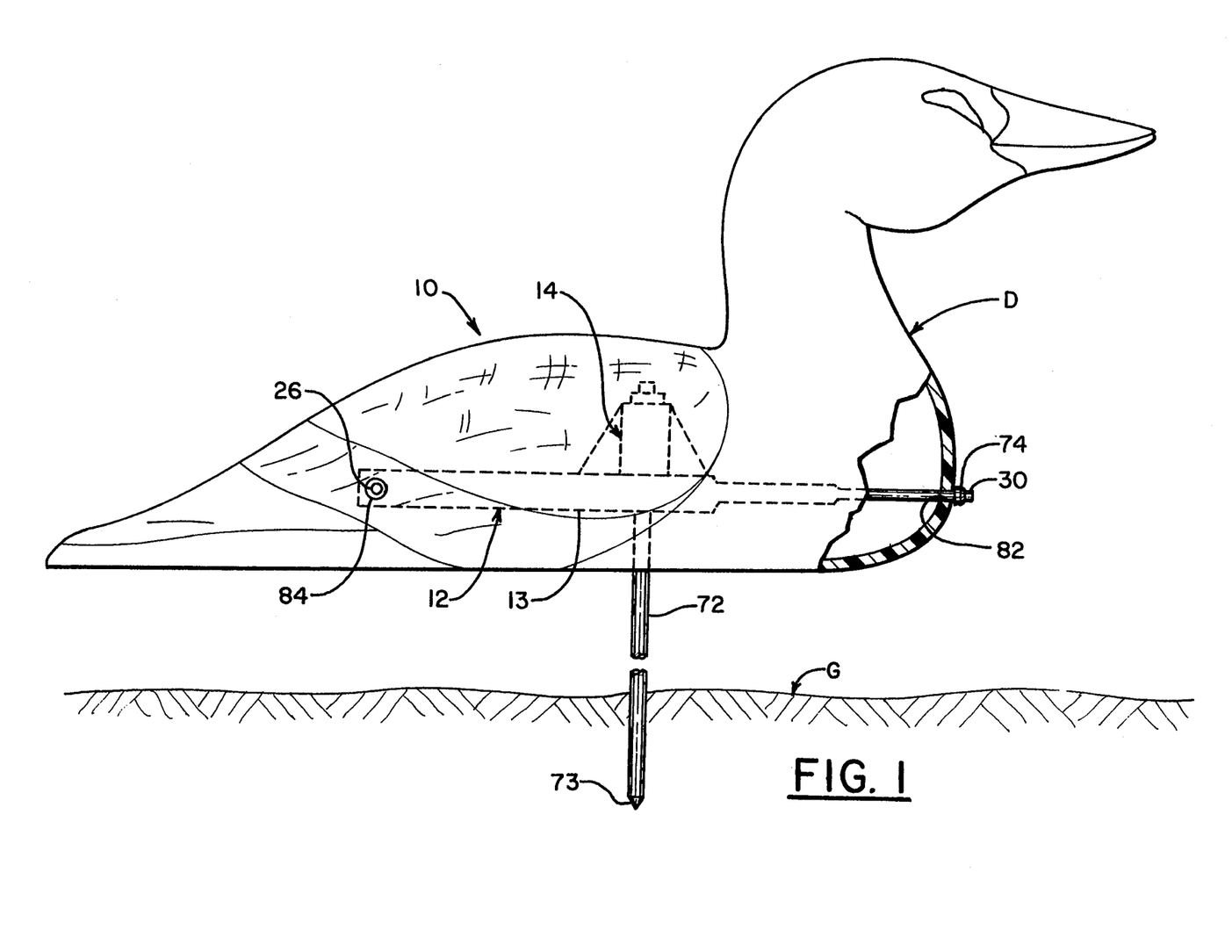
FIG. 1 is a side elevation view of the mounting assembly of the present invention shown mostly in phantom lines inserted within the body of a decoy with a portion of the body of the decoy cut away to reveal a front mounting point and structure.
Figure 2:
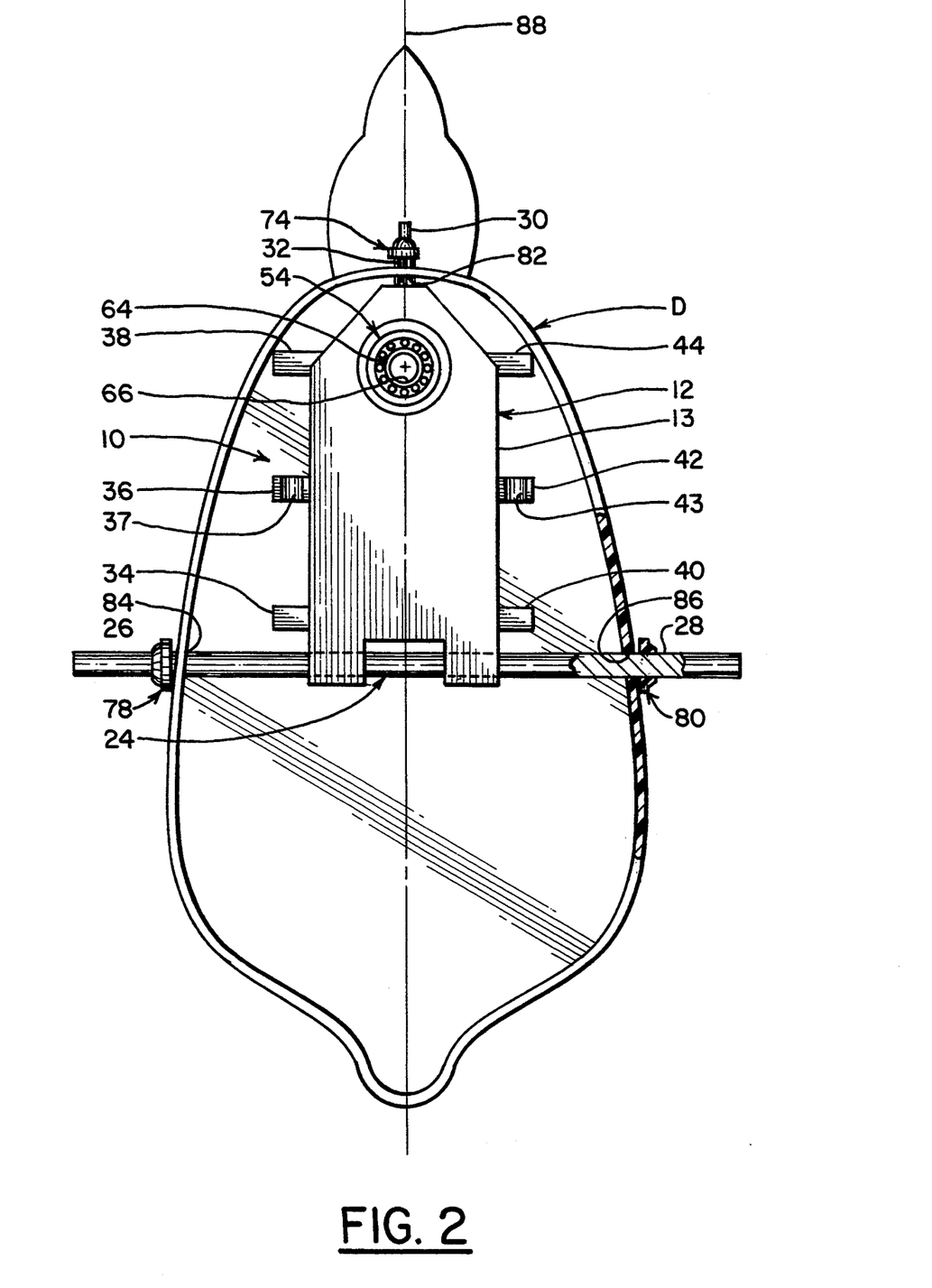
FIG. 2 is a bottom plan view of the frame portion of the mounting assembly as mounted in a decoy body with a portion cut away to reveal a side mounting point.
Figure 3:
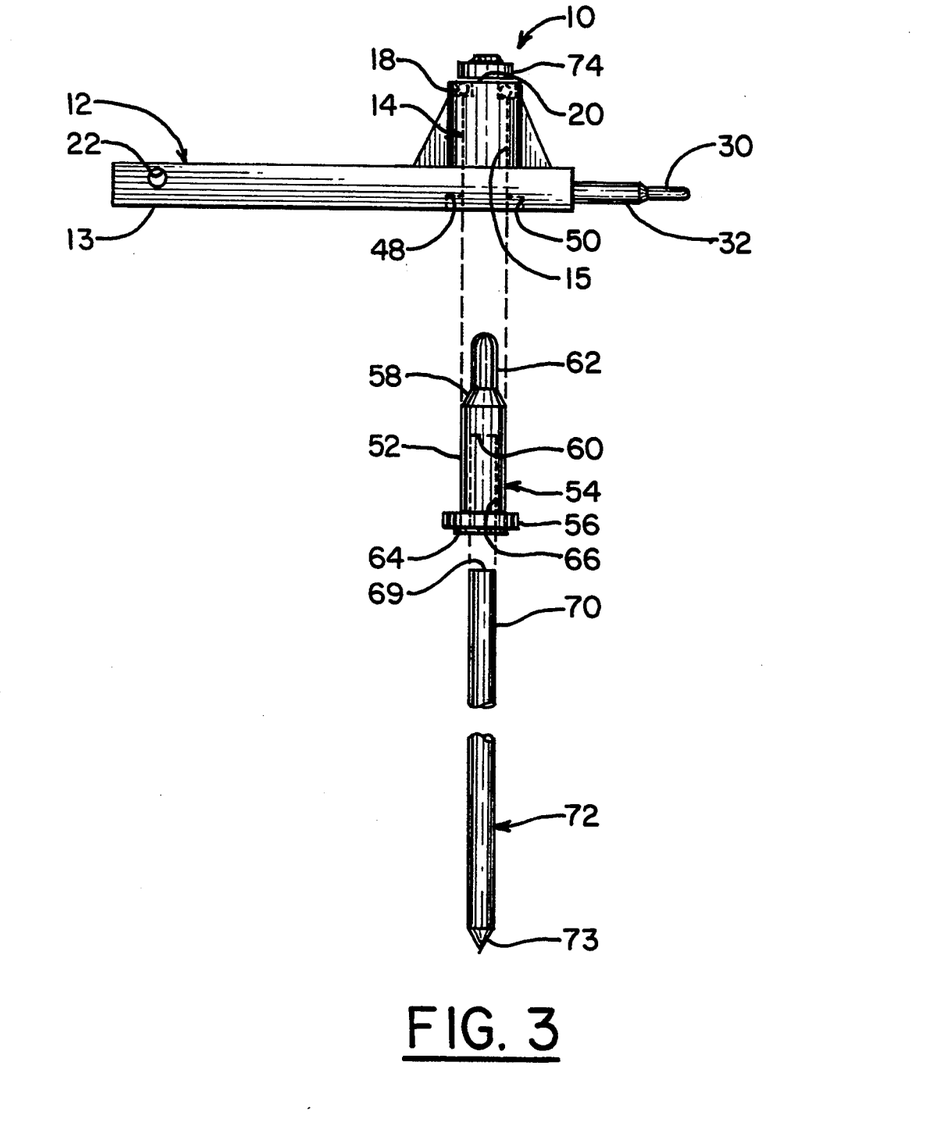
FIG. 3 is of the exploded side elevation view of the decoy mounting assembly.
Figure 4:
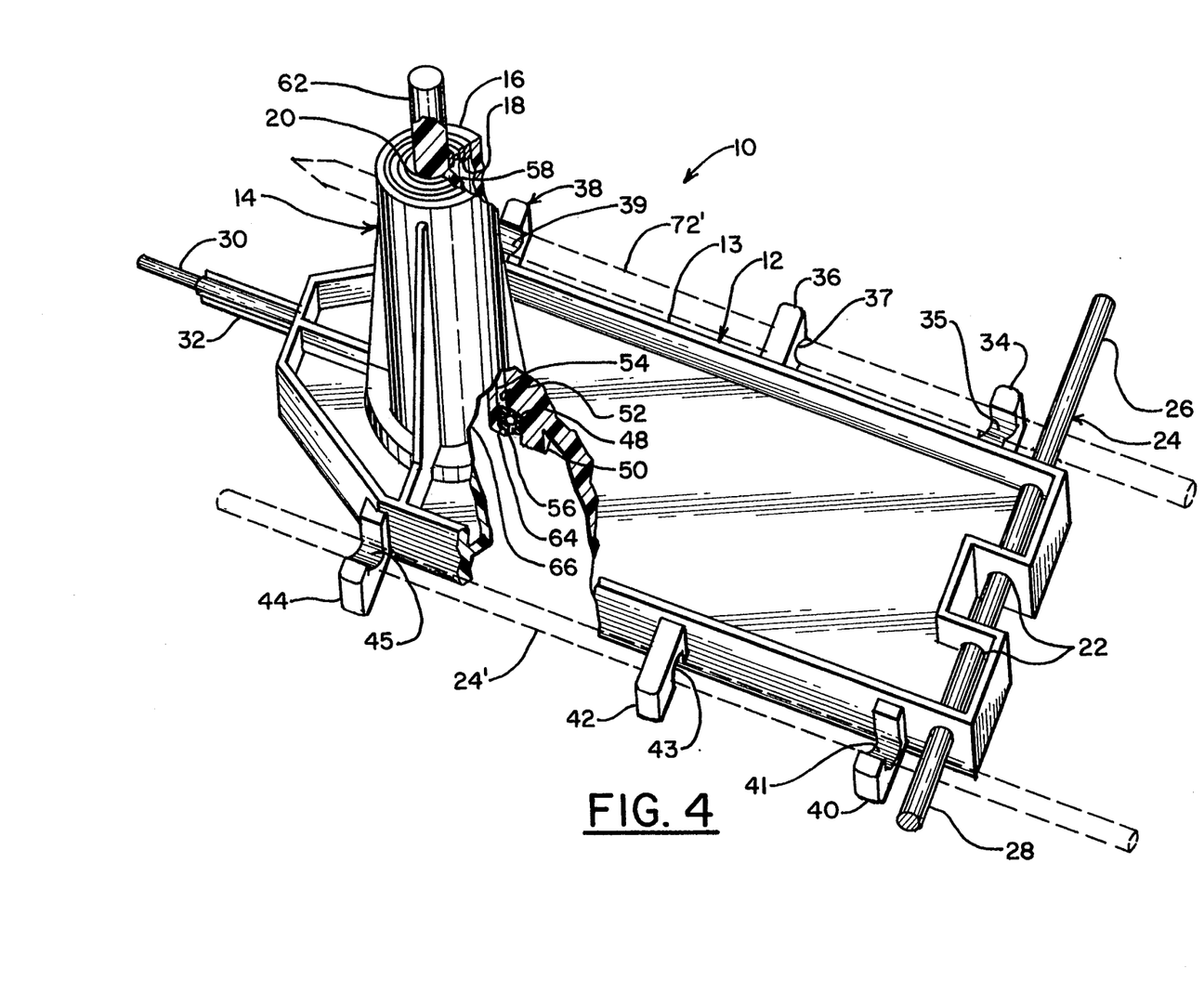
FIG. 4 is a perspective view of the decoy mounting assembly of the present invention with portions cut away to reveal the internal structure as assembled.

The decoy mounting assembly 10, according to this invention, is shown in FIGS. 1 and 2 as it is mounted within the body of a decoy. It comprises a mounting frame 12, having a ball bearing mounted sleeve 14 or hub, in combination with a base platform 13, and a ball bearing mounted concentric spindle 54. Perspective views of the mounting frame 12, and ball bearing mounted concentric spindle 54 are also shown separated from each other in FIGS. 5 and 6, respectively, to illustrate their individual structures and will be discussed in detail below. Essentially, mounting assembly 10 is assembled, as best seen in FIGS. 3 and 4, by inserting spindle 54 into sleeve 14. A narrowed distal end or neck 62 on spindle 54 protrudes through a narrowed opening 20 in the top of sleeve 14 where it is engaged and held in that position by a rubber fastener 74. The structure of the rubber fastener 74 will be described in more detail below. Mating or aperture holes 82, 84, and 86 are placed at spaced apart locations about the periphery of a decoy D body, as shown in FIGS. 1 and 2, for receiving mounting point, strut or finger 30, and mounting points or struts 26, and 28, being the distal ends of a rod 24, respectively, which extend outwardly from the mounting assembly 10. Likewise, rubber fasteners 76, 78, and 80 are positioned over the mounting point 30 and struts 26 and 28, which project through the mating holes 82, 84, and 86, respectively, to securely fasten the mounting assembly 10 to the decoy D. The decoy D, securely fastened to the mounting assembly 10, is then rotatably placed over stake 72 which has been previously pushed or hammered into the ground G. As discussed in detail below the mounting assembly 10 lends stability and adaptability to a variety of various sized decoys, while at the same time allowing the decoy D to automatically align itself, so as to continually face directly into the wind. Although a hunting decoy has been used to illustrate the mounting assembly 10 of the present invention, it is to be understood that any body or ornament could be rotatably mounted using this invention, thus, this invention should not be construed as being limited in scope to only pivotal mounting of decoys.

Figure 6:
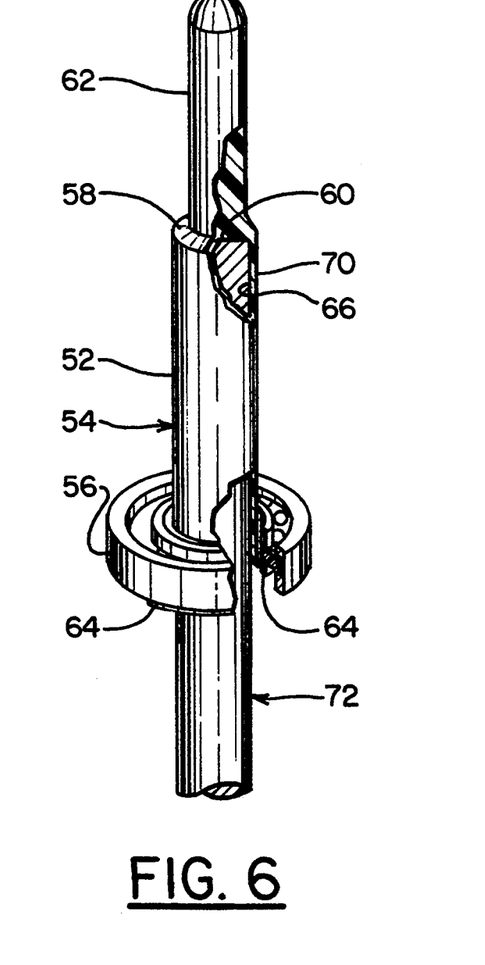
FIG. 6 is a perspective view of the bail bearing mounted concentric spindle of the present invention rotatably positioned on a rod or stake with portions cut away to reveal the internal structure.

Referring now to FIG. 6, the spindle 54 is preferably, but not necessarily molded from a rigid plastic material and includes an elongated main spindle shaft 52 with the smaller diameter neck portion 62 extending from one end of the main spindle shaft 52. An upper shoulder 58 is formed where the larger diameter main spindle shaft 52 terminates into the neck portion 62 and forms a bearing surface for a longitudinal thrust bearing 18 (not shown in FIG. 6), which will be described in more detail below. The proximal end of the main spindle shaft 52 terminates in a radially outwardly flared flange 64 and has a counter bore 66 that extends axially through most of the longitudinal length of the main spindle shaft 52. A ball bearing 56 is press fit onto the main spindle shaft 52 of spindle 54 so that it is seated on flange 64.

Figure 5:
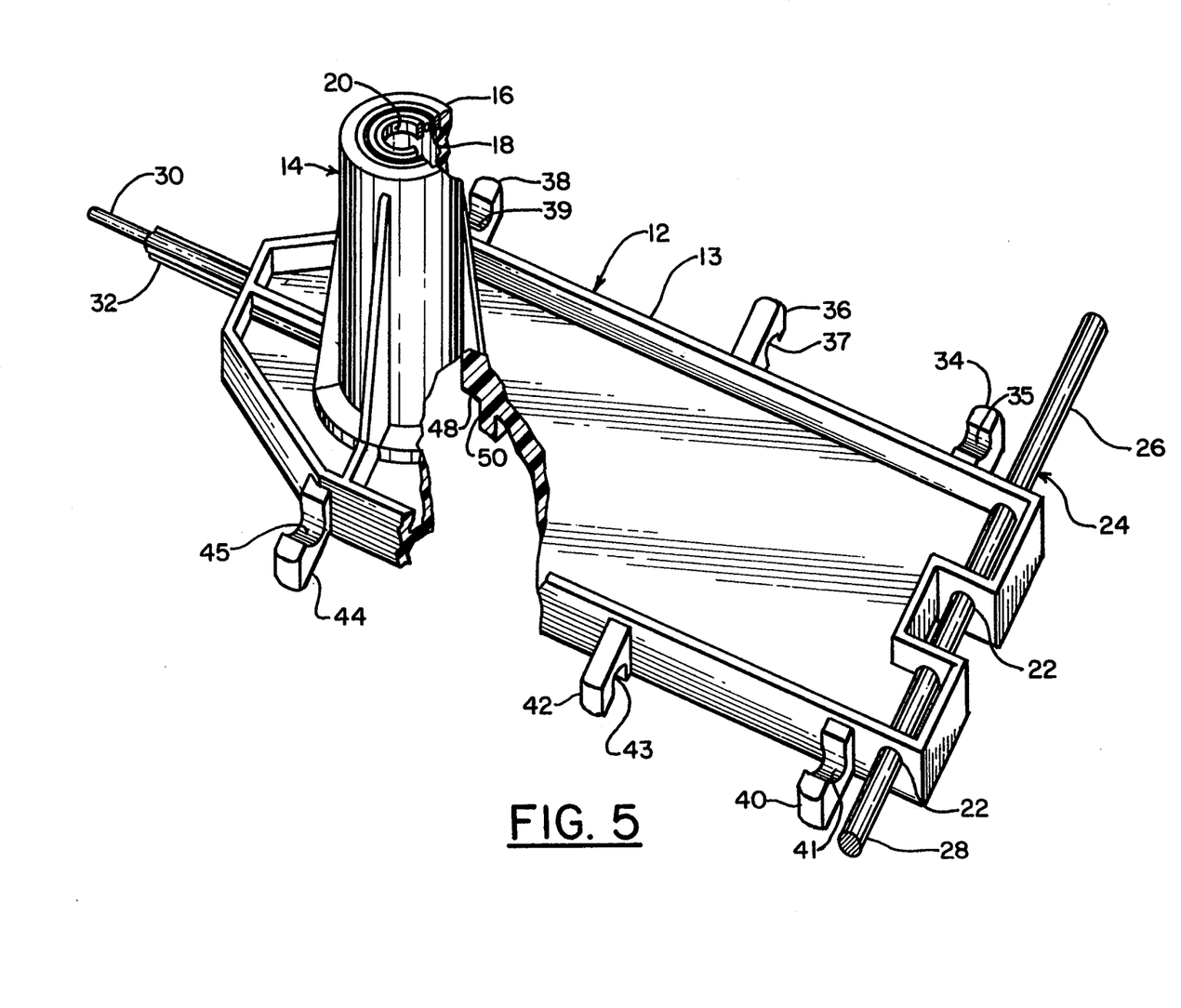
FIG. 5 is a perspective view of the combination base platform and ball bearing mounted sleeve or hub of the present invention.

The mounting frame 12 of the mounting assembly 10, shown in FIG. 5, is preferably, although not necessarily molded from a unitary piece of the same plastic material as used for the spindle 54 and includes an oblong base platform 13 with a sleeve 14 protruding transversely outward near one end of the oblong base platform 13. Sleeve 14 has an axial or sleeve bore 15 extending therethrough, and a ball bearing 18 is press fit concentrically into sleeve 14 so that it is flush with the upper edge 16 of sleeve 14. The lower end of sleeve bore 15 has a larger diameter end portion 50, which results in an annular seating surface shoulder 48 extending radially outward from sleeve 14 for the bearing 56 of spindle 54 (FIG. 6) when the spindle 54 is assembled with the sleeve 14, as shown in FIGS. 3 and 4. Also, when assembled as shown in FIGS. 3 and 4, the shoulder or bearing surface 58 on spindle 54 bears on upper bearing 18 in the upper edge 16 of sleeve 14 as the neck potion 62 of spindle 54 protrudes through the axial bore 15 in upper bearing 18. Consequently, the upper bearing 18 provides both longitudinal and lateral bearing stability to the upper end of spindle 54 in sleeve 14, while the lower bearing 56 provides both longitudinal and lateral stability to the lower end of spindle 54 in sleeve 14. Consequently, the spindle 54 is journaled for rotation in sleeve 14, but it is fixed against longitudinal and transverse movement therein. Therefore, when the assembled frame 12 and spindle 54 are mounted on the stake 72, as shown in FIGS. 1 and 3, by inserting the upper end 70 of stake 72 into the counterbore 66 in spindle 54, the weight of the frame 12 is transferred to and born by the stake 72 via the upper bearing 18 and shoulder 58, lower bearing 56, bearing surface 48, flange 64, and surface 60 at the upper end of counterbore 66 in spindle 54. At the same time, the frame 12 is freely rotatable on spindle 54, which remains essentially stationary in relation to the stake 72. As mentioned briefly above, the fastener 74 above sleeve 14 engages the neck 62 of spindle 54 to prevent its removal from sleeve 14 and frame 12.

As also briefly mentioned above, the frame 12 is adapted for three-point mounting to a decoy body D, as shown in FIGS. 1 and 2. Referring now primarily to FIGS. 2 and 4, a front mount is provided by a strut 32 protruding longitudinally from the front end of the frame 12, which terminates in a finger 30 at its distal end. This finger 30 is adapted to extend through a mating hole 82 in the decoy body D. Lateral or side mounts are provided by an elongated rod 24 that extends laterally in opposite directions from the back end of frame 12 through the mating holes 84 and 86 in diametrically opposite sides of the decoy body D. In the preferred embodiment of this invention, the rod 24 is removeably attached to frame 12, so it can be removed and replaced with longer or shorter rods (not shown) to accommodate mounting larger or smaller decoys (not shown), if desired. The rod 24 is shown in FIGS. 4 and 5 removebly mounted in frame 12 by inserting it through a hole or holes 22 in the back of frame 12. Of course, other mounting structures for rod 24 may be equally effective for the purposes of this invention. As also shown in FIGS. 1 and 2, and as mentioned briefly above, removable fasteners 76, 78, and 80, can be positioned on the end of finger 30 and on the opposite ends 26 and 28 of rod 24 after the decoy D is mounted as described above to secure the decoy D to the frame 12.

Front mating hole 82 is preferably placed along the front periphery of the decoy D body at approximately the centerline 88 of the decoy D, as shown in FIGS. 1 and 2, to receive finger 30. Lateral mating holes 84 and 86 are preferably placed along the lateral sides of the decoy D body diametrically opposite one another and at about the same level as front mating hole 82, to assure that the decoy D is mounted horizontally on mounting assembly 10.

During the mounting procedure the finger 30 is first inserted through the mating hole 82 at the front of the decoy D, and the rubber fastener 76 can be installed. Then, the rod 24 is inserted through mating hole 84 in one side of the decoy D and pushed all the way through the hole 22 of base platform 13 until end 28 is finally extended through the mating hole 86 on the opposite side of the decoy D. Rubber fasteners 78 and 80 can then be placed on ends 26 and 28 of rod 24 to complete the installation of the mounting assembly 10 within the decoy D according to this invention. The order in which the mounting points 30, 26, and 28 are inserted into the mating holes 82, 84, and 86 is not particularly important to the invention; however, the procedure described above will generally be the most convenient.

Figure 7:
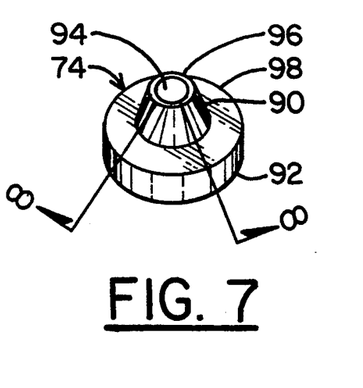
FIG. 7 is a perspective view of a rubber fastener having a combination cylindrical and conical body used according to this invention.
Figure 8:
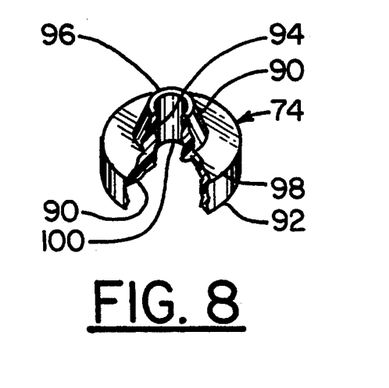
FIG. 8 is a perspective view of the fastener shown in FIG. 7, but with a quarter section cut away along lines 8—8 of FIG. 7.

The rubber fastener 74, shown in FIGS. 7 and 8, which may also be representative of the fasteners 76, 78, and 80, has a unitary body comprising a conical section 90 protruding axially outward from a cylindrical section 92 with an axial bore 94 extending through both the cylindrical section 92 and the conical section 90. The outer circumference of the conical section 90 gradually increases from a top edge 96 to a shoulder 98 at the top surface of the cylindrical section 92. When a shaft, such as neck 62 of spindle 54, finger 30, or rod ends 26, and 28, is inserted into axial bore 94 at edge 100, pressure exerted on shoulder 98 allows the shaft to slide easily through the bore 94. However, pressure exerted in the opposite direction, that is, on the surface 102 opposite that of shoulder 98 causes the upper edge 96 of conical section 90 to pinch together. This pinching results in increased friction, or a "grabbing" by the rubber fastener 74 on the shaft. Consequently, the force required to remove the rubber fastener 74 from a shaft is much greater than the force required to position the rubber fastener 74 onto a shaft.

In use, the mounting assembly 10 assembled within the decoy D, as described above is placed on stake 72, having a pointed end 73, which has been previously pushed or hammered into the ground G. The distal end 70 of stake 72, opposite from that of point 73, is generally flat and provides a beating surface 69, as described above, when it is inserted into the counter bore 66 of the ball bearing mounted concentric spindle 54. The rotational movement of the decoy D is enhanced, as described above, by the ball bearings 18 and 56, thus, allowing the slightest crosswinds or other breezes, to produce a movement of the decoy D so that it always can align itself to face directly into the wind.

When disassembling the mounting assembly 10 for transport or storage, the decoy D with frame 12 is lifted off the end 70 of stake 72. The removal of rubber fasteners 76, 78, and 80, can be removed from the respective mounting points 30, 26, and 28. Rod 24 can then be removed from the hole 22 in frame 12, thus allowing for the complete removal of the mounting assembly 10 from within the decoy D. Stake 72 can then be removed from the ground G. A set of hangers 40, 42 and 44 illustrated in FIGS. 4 and 5, can be provided according to another feature of this invention protruding from a lateral side of the frame 12 to receive and retain the rod 24 in a storage position, as shown by phantom lines 24' in FIG. 4. Each individual hanger 40, 42, and 44 has a respective channel 41, 43, and 45 of about the same diameter or slightly larger than that of rod 24. Hangers 40 and 44 near the ends of base platform 13 are positioned so that their channels 41 and 45 face upwardly, while the hanger 42 protruding from the middle is positioned with its channel 43 facing in a downward direction. When rod 24 is positioned in the channels 41, 43, and 45 of these three hangers 40, 42, and 44, as illustrated at 24' in FIG. 4, the outer hangers 40, 44, cradle and support the rod 24, while the middle hanger 42 retains it in that position. In fact, the hanger 42 can be positioned with its channel 43 slightly out of alignment with channels 41, 45 of hangers 40, 44, thereby requiring a slight flexure of rod 24 to be mounted in the hangers 40, 42, 44. This unaligned configuration can provide a frictional engagement of the rod 24 by the hangers 40, 42, 44 to keep the rod 24 from sliding out to easily. The rubber fasteners 78 and 80 can also be positioned on the distal ends 26, 28 of rod 24 to keep the rod 24 from sliding out of hangers 40, 42, and 44 and becoming separated from the mounting frame 12. A similar set of hangers 34, 36, and 38 can be positioned on the opposite side of frame 12 for storing the stake 72 when not in use, as illustrated by the phantom lines 72' in FIG. 4. These hangers 34, 36, 38 may have to have larger diameter channels 35, 37, 39 to accommodate the stake 72.

The forgoing description is considered as illustrative only of the principals of the invention. Furthermore, since numerous modifications and changes will readily occur to those skilled in the art, it is not desired to limit the invention to the exact construction and processes shown as described above. Accordingly, all suitable modifications and equivalents may be restored to falling within the scope of the invention as defined by the claims which follow.

The embodiments of the invention in which an exclusive property or privilege is claimed are defined as follows:

1. Mounting apparatus for mounting a body in a manner that accommodates automatic rotational movement of the body about a stake or other fixed point comprising:

spindle means for providing a pivotal point, said spindle means includes an axial counter bore therein for receiving the stake:

frame means for supporting the body, said frame means including multiple-point mounting means for attachment to the body, and an elongated sleeve means for receiving said spindle means, wherein said sleeve means includes an upper end and a lower end, said lower end having a shoulder extending radially outward from said sleeve.

2. The mounting apparatus of claim 1, wherein said frame means has a width and a length, a first side and a second side spaced in parallel relation to one another, and wherein said first and said second side span said length of said frame and a front and back side also spaced in parallel relation spanning said width of said frame.

3. The mounting apparatus of claim 2, wherein traversing the width of said frame means includes a bore positioned near said back side and running through the width of said frame perpendicular to said first and second sides.

4. The mounting apparatus of claim 3, wherein a rod having a first end and a second end is positioned in said bore so that said first end extends laterally outward from said frame means and perpendicular to said second side, while said second end also extends laterally outward from said frame means and perpendicular to said first side.

5. The mounting apparatus of claim 4, wherein said first end and said second end of said rod are two of said multiple-point mounting means, and a third mounting point means is positioned along the front side and extends laterally outward from said frame means and perpendicular to said front side.

6. The mounting apparatus of claim 1, wherein said sleeve includes a counter bore for receiving said spindle means and said counter bore has an axis which is positioned perpendicular to said frame means.

7. The mounting apparatus of claim 1, including a first ball bearing concentrically positioned in said upper end of said sleeve means.

8. The mounting apparatus of claim 1, wherein a second ball bearing is positioned concentrically about said spindle.

9. The mounting apparatus of claim 8, wherein said sleeve means contacts said spindle means only through said first and second ball bearing means thereby reducing the friction resulting from the rotational movement about said spindle means.

10. The mounting apparatus of claim 1, including a fastener means for securing said multiple-point mounting means to the body.

11. The mounting apparatus of claim 10, wherein said fastener means includes a unitary body having a combination of cylindrical and conical sections, having an axial bore.

12. The mounting apparatus of claim 11, wherein a force on said cylindrical section opens said conical section allowing said mounting point to easily pass through said bore until said fastener means comes to rest next to the body.

13. The mounting apparatus of claim 11, wherein said unitary body is made of a rubber material.

14. The mounting apparatus of claim 2, wherein said first side includes a plurality of hangers that extend laterally outward from said frame means down said length of said first side, and said second side includes three hangers positioned in the same manner as said hangers on said first side.

15. The mounting apparatus of claim 14, wherein said hangers include a channel having a diameter equivalent to the diameter of said rod, said channels positioned at said front end and said back end of said frame are oriented in an upward direction so that said rod is cradled in said channels, whereas said channel of said hanger positioned in the middle of said first side is oriented in a downward position securing said rod in position, said rod is thereby held by said hangers in a position parallel to said first side.

16. The mounting apparatus of claim 14, wherein said hangers include a channel having a diameter equivalent to the diameter of the stake, said channels positioned at said front end and said back end of said frame are oriented in an upward direction so that the stake is cradled in said channels, whereas said channel of said hanger positioned in the middle of said second side is oriented in a downward position securing the stake in position, the stake is thereby retained by said hangers in a position parallel to said second side.

17. The mounting apparatus of claim 15, wherein said rod is further secured in said hangers by positioning said fastener means around said ends of said rod.

18. The mounting apparatus of claim 16, wherein the stake is further secured in said hangers by positioning said fastener means around said ends of the stake.

19. The mounting apparatus of claim 1, wherein the body may be a decoy of the type used in hunting.

20. Mounting apparatus for mounting a decoy body in a manner that accommodates rotational movement of the body about a stake or other fixed pivot point, comprising:

frame means for supporting the decoy body wherein said frame means has a transverse hole therethrough;

first mounting strut protruding longitudinally from one end of the frame means in a direction perpendicular to said transverse hole;

lateral side mounts protruding transversely in opposite directions from the other end of the frame means, wherein said lateral side mounts include a second mounting strut and a third mounting strut that are opposite ends of an elongated rod that is removably attached to said frame means, said decoy body having a first aperture in the front of the decoy body and a second and third aperture in diametrically opposite side portions of the decoy body therein for receiving said first, second and third mounting struts; and pivotal mounting means for pivotally mounting said frame means on said stake.

21. The mounting apparatus of claim 20, wherein said pivotal mounting means includes an elongated sleeve extending laterally outward from said frame means, said sleeve having a first ball beating positioned at one end of said sleeve and a second ball bearing positioned at the other end of said sleeve; and an elongated spindle rotatably mounted in said sleeve, said spindle being adapted for mounting on said stake in such a manner that said frame means is rotatable about said spindle and rotatable in relation to said stake, said spindle has an axis of rotation that is approximately perpendicular to said first, second and their mounting struts.

22. The mounting apparatus of claim 20, wherein said pivotal mounting means includes an elongated sleeve in said frame means, said sleeve having an upper end and a lower end, wherein a bail bearing is concentrically positioned within said upper end and said lower end having a shoulder extending radially outward from said sleeve.

23. The mounting apparatus of claim 2, wherein said sleeve includes a counter bore for receiving said spindle means and said counter bore has an axis which is positioned perpendicular to said frame means and said axis is positioned at a nonequal distance between said first side and said second side and at a nonequal distance between said front and said back side.

24. The mounting apparatus of claim 21, wherein said frame means has a width and length, a first side and a second side spaced in parallel relation to one another, and wherein said first and second side span said length of said frame and a front and back side also spaced in parallel relation spanning said width of said frame.

25. The mounting apparatus of claim 24, wherein said sleeve includes a counter bore for receiving said spindle means and said counter bore has an axis which is positioned perpendicular to said frame means and said axis is positioned at a nonequal distance between said first side and said second side and at a nonequal distance between said front and said back side.

26. The mounting apparatus of claim 20, including first, second, and third removeable fasteners for insertion on said struts when said struts extend through said first, second, and third apertures to retain said struts in said apertures.

27. The mounting apparatus of claim 26, wherein each of said fasteners is made of a resilient material in the form of conical section protruding axially from a longer diameter cylindrical section with an axially hole extending through both said conical and cylindrical sections.

28. The mounting apparatus of claim 21, wherein said spindle includes a first elongated cylindrical portion having a first outside diameter with a second elongated neck portion with a second outside diameter that is smaller than said first outside diameter extending longitudinally from one end of said first elongated portion such that said one end of said first elongated portion forms an annular shoulder extending radially outward from said neck portion, said annular shoulder being positioned to bear axially on said first bail bearing while said neck portion extends axially through said first bail bearing for transverse bearing support.

29. The mounting apparatus of claim 28, wherein said first elongated portion of said spindle extends through said second bail bearing for transverse support.

30. The mounting apparatus of claim 21, wherein said spindle includes a longitudinal counterbore extending axially therein for receiving an end of said stake.

31. The mounting apparatus of claim 28, wherein said first elongated portion of said spindle has a counterbore extending axially into its end that is opposite said neck portion, said counterbore being sized to receive an end of said stake therein.

32. The mounting apparatus of claim 20, including hanger means protruding from a side of said frame means for mounting said rod in an alternate storage position on said frame means, wherein said hanger means includes a first and second cradle in spaced apart relation to each other, each with a channel opening in one direction, and a third cradle with a channel in approximate axial alignment with said channels of said first and second cradles, but opening in the opposite direction from said first and second cradles.

33. The mounting apparatus of claim 21, wherein said elongated spindle includes a ball-bearing concentrically positioned about said elongated spindle.

* * * * *

UNITED STATES PATENT AND TRADEMARK OFFICE
CERTIFICATE OF CORRECTION

PATENT NO. : 5,392,554
DATED : February 28, 1995
INVENTOR(S) : Virgil L. Farstad, et al.

It is certified that error appears in the above-indentified patent and that said Letters Patent is hereby corrected as shown below:

In column 2, line 48, change "bail" to --ball--.

In column 5, line 29, change "beating" to --bearing--.

In the Claims

In column 6, line 28, change ":" to --;--.
In column 8, line 15, change "beating" to --bearing--.
In column 8, line 27, change "bail" to --ball--.
In column 9, line 3, change "bail" to --ball--.
In column 9, line 4, change "bail" to --ball--.
In column 9, line 8, change "bail" to --ball--.

Signed and Sealed this

Twenty-first Day of May, 1996

Attest:

BRUCE LEHMAN

Attesting Officer     Commissioner of Patents and Trademarks